(12) United States Patent
McCuiston et al.

(10) Patent No.: US 10,685,310 B1
(45) Date of Patent: Jun. 16, 2020

(54) UTILIZING A MACHINE LEARNING MODEL TO DETERMINE COMPLEXITY LEVELS, RISKS, AND RECOMMENDATIONS ASSOCIATED WITH A PROPOSED PRODUCT

(71) Applicant: Capital One Service, LLC, McLean, VA (US)

(72) Inventors: Daryl McCuiston, Powhatan, VA (US); Gregory Powell, Richmond, VA (US); Zaheer Ladak, Richmond, VA (US); Jennifer Little, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/401,743

(22) Filed: May 2, 2019

(51) Int. Cl.
*G06Q 10/06* (2012.01)
*G06Q 10/10* (2012.01)
*G06N 20/00* (2019.01)

(52) U.S. Cl.
CPC ......... *G06Q 10/0635* (2013.01); *G06N 20/00* (2019.01); *G06Q 10/0637* (2013.01)

(58) Field of Classification Search
CPC .............................. G06Q 10/06; G06Q 10/10
USPC ....................................................... 705/7.28
See application file for complete search history.

(56) References Cited

U.S. PATENT DOCUMENTS

| 7,672,921 B1 * | 3/2010 | Clay | G06Q 10/06 706/45 |
| 2009/0319420 A1 * | 12/2009 | Sanchez | G06Q 40/00 705/38 |
| 2011/0119106 A1 * | 5/2011 | Dahl | G06Q 10/06 705/7.28 |
| 2013/0179215 A1 * | 7/2013 | Foster | G06Q 10/00 705/7.28 |
| 2017/0161758 A1 | 6/2017 | Towriss | |
| 2019/0147371 A1 * | 5/2019 | Deo | G06N 20/20 706/12 |

* cited by examiner

*Primary Examiner* — Nga B Nguyen
(74) *Attorney, Agent, or Firm* — Harrity & Harrity, LLP

(57) ABSTRACT

A device receives historical risk management data associated with products and processes the historical risk management data to generate processed historical risk management data. The device trains a machine learning model with the processed historical risk management data to generate a trained machine learning model and receives, from a user device, product data associated with a potential product. The device applies weights to different portions of the product data, based on risks associated with the different portions of the product data, to generate weighted product data and processes the weighted product data, with the trained machine learning model, to generate one or more of complexity levels, risk data, or recommendations associated with the potential product. The device performs one or more actions based on the one or more of the complexity levels, the risk data, or the recommendations associated with the potential product.

20 Claims, 12 Drawing Sheets

120
Receive product data associated with a potential product
*(Product description, estimated cost to produce, audience size for deployment, area of focus, interview customers, only test the product, test audience size, etc.)*

UTILIZING A MACHINE LEARNING MODEL TO DETERMINE COMPLEXITY LEVELS, RISKS, AND RECOMMENDATIONS ASSOCIATED WITH A PROPOSED PRODUCT

BACKGROUND

An innovator often develops a product (e.g., a good, a service, and/or the like) without a clear picture of risks associated with the product. Product innovation may improve or be more efficient if risks associated with product innovation can be identified early and addressed.

SUMMARY

According to some implementations, a method may include receiving historical risk management data associated with products, wherein the historical risk management data may include one or more of legal risk data associated with the products, operational risk data associated with the products, compliance risk data associated with the products, cybersecurity risk data associated with the products, reputational risk data associated with the products, or information indicating subject matter expertise associated with the products. The method may include processing the historical risk management data to generate processed historical risk management data in a format for training a machine learning model and training the machine learning model with the processed historical risk management data to generate a trained machine learning model. The method may include receiving, from a user device, product data associated with a potential product and applying weights to different portions of the product data, based on risks associated with the different portions of the product data, to generate weighted product data. The method may include processing the weighted product data, with the trained machine learning model, to generate one or more of complexity levels, risk data, or recommendations associated with the potential product and performing one or more actions based on the one or more of the complexity levels, the risk data, or the recommendations associated with the potential product.

According to some implementations, a device may include one or more memories and one or more processors, communicatively coupled to the one or more memories, configured to receive historical risk management data associated with products and process the historical risk management data to generate processed historical risk management data in a format for training a machine learning model. The one or more processors may train the machine learning model with the processed historical risk management data to generate a trained machine learning model and receive, from a user device, product data associated with a potential product. The one or more processors may apply weights to different portions of the product data, based on risks associated with the different portions of the product data, to generate weighted product data and may process the weighted product data, with the trained machine learning model, to generate one or more of complexity levels, risk data, or recommendations associated with the potential product. The one or more processors may provide, to the user device, information indicating the one or more of the complexity levels, the risk data, or the recommendations associated with the potential product and may receive, from the user device, updated product data based on the information indicating the one or more of the complexity levels, the risk data, or the recommendations. The one or more processors may apply the weights to different portions of the updated product data, based on risks associated with the different portions of the updated product data, to generate weighted updated product data and may process the weighted updated product data, with the trained machine learning model, to generate one or more of updated complexity levels, updated risk data, or updated recommendations associated with the potential product. The one or more processors may provide, to the user device, information indicating the one or more of the updated complexity levels, the updated risk data, or the updated recommendations associated with the potential product.

According to some implementations, a non-transitory computer-readable medium may store instructions that include one or more instructions that, when executed by one or more processors of a device, cause the one or more processors to receive, from a user device, product data associated with a potential product and apply weights to different portions of the product data, based on risks associated with the different portions of the product data, to generate weighted product data. The one or more instructions may cause the one or more processors to process the weighted product data, with a trained machine learning model, to generate one or more of complexity levels, risk data, or recommendations associated with the potential product, wherein a machine learning model may be trained with historical risk management data associated with products to generate the trained machine learning model, and wherein the historical risk management data may include one or more of legal risk data associated with the products, operational risk data associated with the products, compliance risk data associated with the products, cybersecurity risk data associated with the products, reputational risk data associated with the products, or information indicating subject matter expertise associated with the products. The one or more instructions may cause the one or more processors to perform one or more actions based on the one or more of the complexity levels, the risk data, or the recommendations associated with the potential product.

DETAILED DESCRIPTION

Figure 1A:
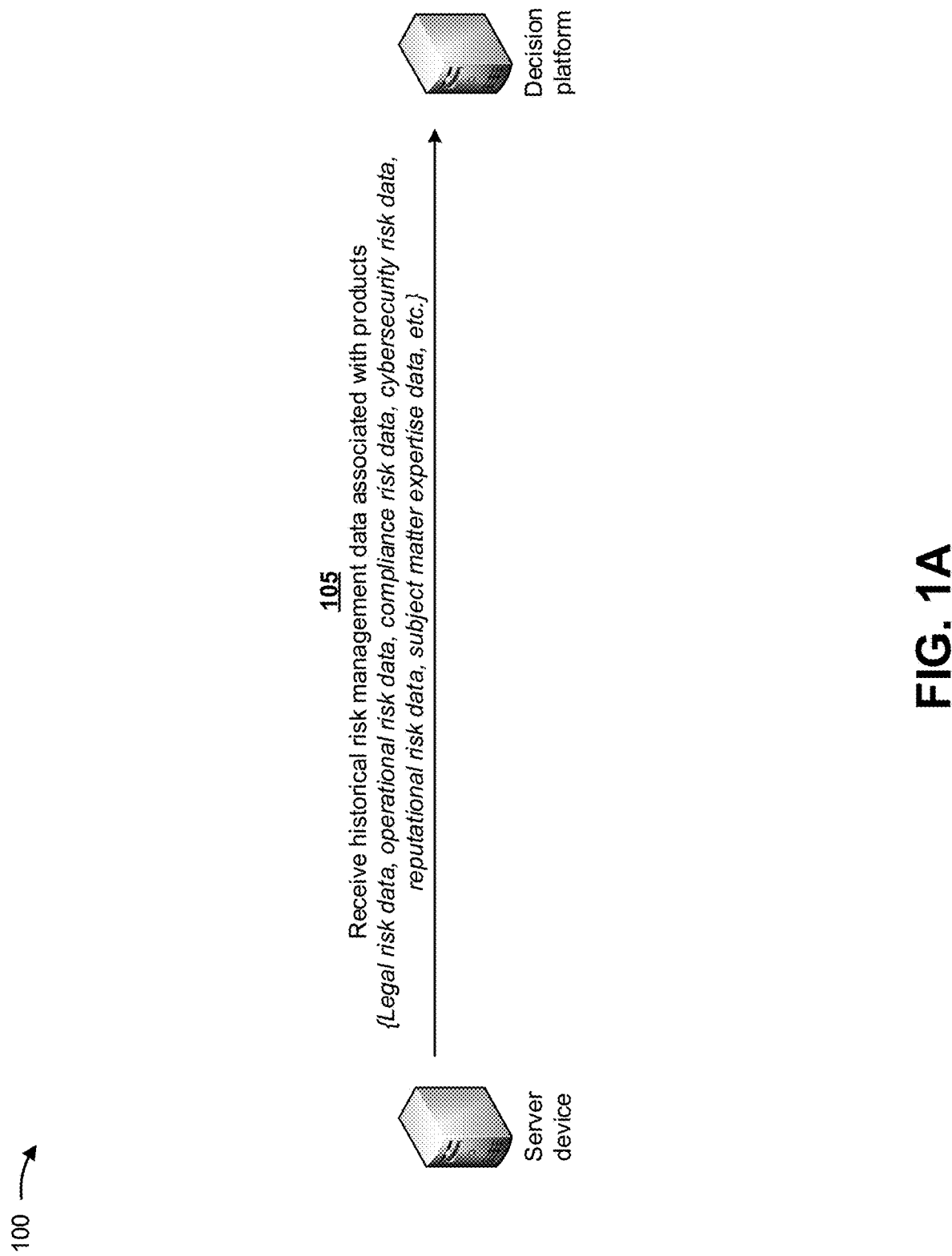
FIGS. 1A-1G are diagrams of an example implementation described herein.

The following detailed description of example implementations refers to the accompanying drawings. The same reference numbers in different drawings may identify the same or similar elements.

Entities (e.g., companies, departments of companies, government agencies, educational institutions, and/or the like) sometimes commit human and financial resources to a new product without a clear understanding of potential downstream risks and impacts. This often results in product rework and redesign (e.g., which waste resources, such as processing resources, memory resources, and/or the like)

that could have been avoided with a clear understanding of potential risks and impacts at a product planning stage. Innovators typically devise new products away from work and concentrate on product development during working hours. The creative energy during initial creation of new products can be stymied by having to wait to speak to a risk professional about general risk questions and approaches.

Some implementations described herein provide a decision platform that utilizes a machine learning model to determine complexity levels, risks, and/or recommendations for a proposed product. For example, the decision platform may receive historical risk management data associated with products, wherein the historical risk management data may include one or more of legal risk data associated with the products, operational risk data associated with the products, compliance risk data associated with the products, cybersecurity risk data associated with the products, reputational risk data associated with the products, or information indicating subject matter expertise associated with the products. The decision platform may process the historical risk management data to generate processed historical risk management data in a format for training a machine learning model and may train the machine learning model with the processed historical risk management data to generate a trained machine learning model. The decision platform may receive, from a user device, product data associated with a potential product and may apply weights to different portions of the product data, based on risks associated with the different portions of the product data, to generate weighted product data. The decision platform may process the weighted product data, with the trained machine learning model, to generate one or more of complexity levels, risk data, or recommendations associated with the potential product and may perform one or more actions based on the one or more of the complexity levels, the risk data, or the recommendations associated with the potential product.

In this way, the decision platform enables innovators to be less risk averse when developing products and/or services since resources (e.g., processing resources, memory resources, human resources, financial resources, and/or the like) are not utilized prior to the products and/or services being ready for implementation. The decision platform provides information associated with potential risks and resource impacts of products and/or services at planning stages of the products and/or services. This, in turn, conserves resources associated with creating products and/or services that would otherwise be wasted in reworking and/or redesigning the products and/or services.

FIGS. 1A-1G are diagrams of an example implementation 100 described herein. As shown in FIG. 1A, a server device may be associated with a decision platform. The server device may be associated with an entity (e.g., a company, an educational institution, a government agency, and/or the like) with employees that create products and/or services. Although products are described herein in connection with FIGS. 1A-1G, implementations described herein may also be utilized with services. In some implementations, the server device may include a risk management information system that assists in consolidating information associated with property values, claims, policy, exposure, and/or the like and provides tracking and management reporting capabilities to enable a user to monitor and control an overall cost of risk management. In some implementations, the functions of the server device may be performed by multiple server devices, a cloud-computing platform, and/or the like.

As further shown in FIG. 1A, and by reference number 105, the decision platform may receive, from the server device, historical risk management data associated with products. In some implementations, the historical risk management data may include legal risk data associated with the products, operational risk data associated with the products, compliance risk data associated with the products, cybersecurity risk data associated with the products, reputational risk data associated with the products, subject matter expertise data associated with the products, and/or the like.

The legal risk data associated with the products may include data indicating risks of losses to the entity caused by defective transactions associated with the products; claims (e.g., including defenses to claims or counterclaims) being made or some other events occurring which result in a liability for the entity or other losses (e.g., as a result of the termination of a contract); failing to take appropriate measures to protect assets (e.g., intellectual property associated with the products) owned by the entity; and/or the like.

The operational risk data associated with the products may include data indicating risks of losses resulting from inadequate or failed internal processes, employees, systems, and/or the like; losses resulting from external events; risks resulting from internal fraud (e.g., misappropriation of assets, tax evasion, intentional mismarking of positions, bribery, etc.); risks resulting from external fraud (e.g., theft of information, hacking damage, third-party theft, forgery, etc.); risks resulting from employment practices and/or workplace safety (e.g., discrimination, workers compensation, employee health and safety, etc.); risks resulting from clients, products, business practices, etc. (e.g., market manipulation, antitrust, improper trade, product defects, fiduciary breaches, account churning, etc.); risks resulting from damage to physical assets (e.g., natural disasters, terrorism, vandalism, etc.); risks resulting from business disruption and/or systems failures (e.g., utility disruptions, software failures, hardware failures, etc.); risks resulting from execution, delivery, and/or process management (e.g., data entry errors, accounting errors, failed mandatory reporting, negligent loss of client assets, etc.); and/or the like.

The compliance risk data associated with the products may include data indicating exposure to legal penalties, financial forfeiture, material loss, and/or the like that an entity faces when the entity fails to act in accordance with industry laws and regulations, internal policies, prescribed best practices, and/or the like; environmental risks (e.g., potential for damage to living organisms or environment arising out of an entity's activities; risks resulting from workplace health and safety (e.g., accidents, repetitive strain injuries, etc.); risks resulting from corrupt practices (e.g., bribery, fraud, etc.); risks resulting from social responsibility (e.g., that business activities will harm employees or people in communities); risks resulting from quality (e.g., releasing a low quality product and/or service that fails to meet an expected level of due diligence in an industry, that violates laws and regulations, etc.); process risks (e.g., risks that processes will fail resulting in legal violations); and/or the like.

The cybersecurity risk data associated with the products may include data indicating risks resulting from threats or vulnerabilities in networks, computers, programs and data, flowing from or enabled by connection to digital infrastructure, information systems, and/or industrial control systems; loss potential that exists as a result of cyber threats; uncertainty of losses resulting from cyber threats; probabilities that hostile entities will successfully exploit particular systems for intelligence purposes; likelihoods that cyber threats will occur, that cyber threat occurrences will result in adverse impacts, and severities of the adverse impacts;

probabilities that particular cyber threats will exploit particular vulnerabilities of systems; and/or the like.

The reputational risk data associated with the products may include data indicating risks resulting from damages to the entity's reputation; risks resulting from increased operating, capital and/or regulatory costs; risks resulting from destruction or reduction of shareholder value due to adverse or potentially criminal events even if the entity company is not found guilty; risks resulting from potential violations associated with ethics, safety, security, sustainability, quality, etc.; and/or the like.

The subject matter expertise data associated with the products may include data indicating subject matter expertise associated with the legal risk, the compliance risk data, the cybersecurity risk data, the reputational risk data, and/or the like.

Figure 1B:
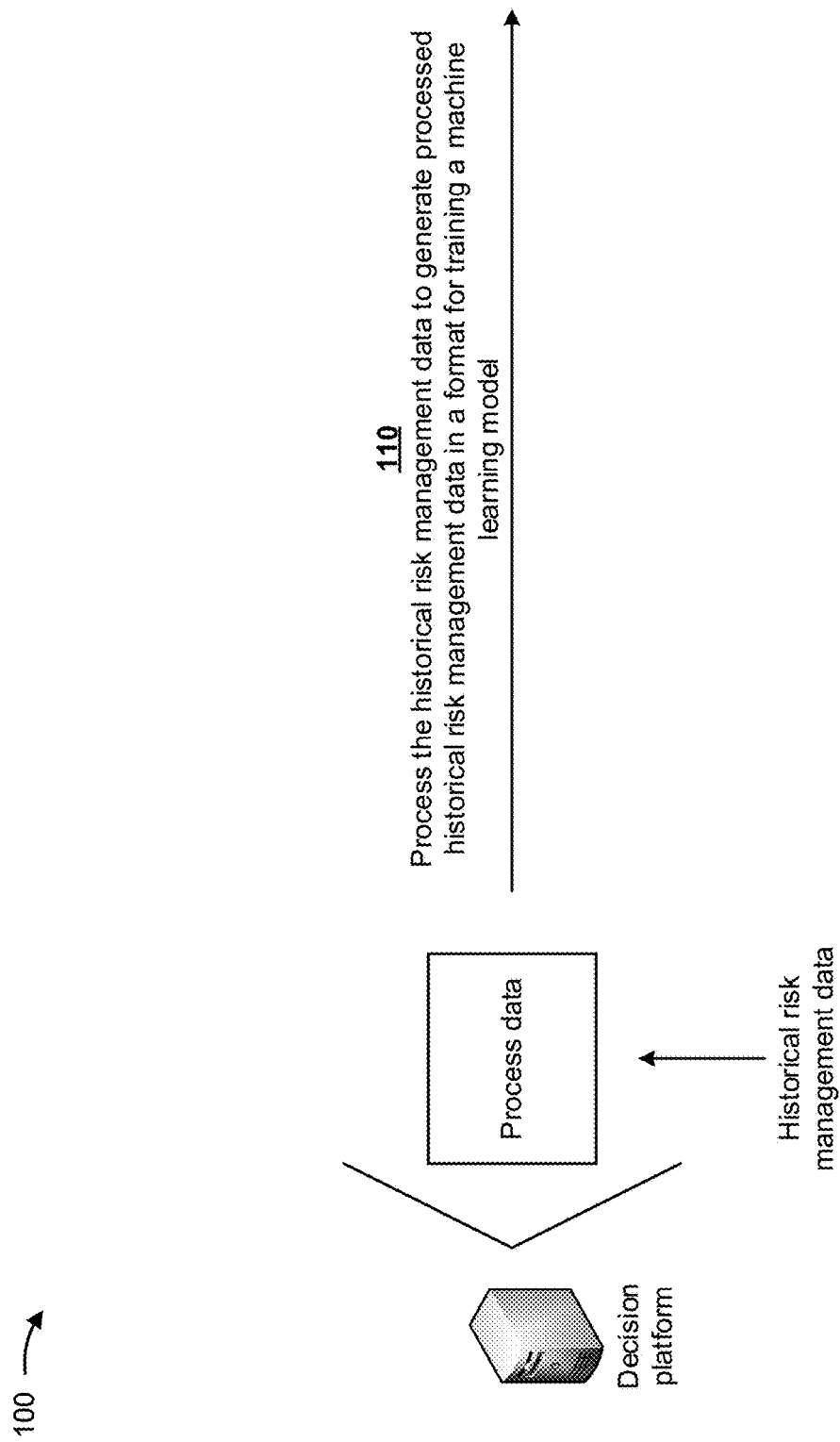

As shown in FIG. 1B, and by reference number 110, the decision platform may process the historical risk management data to generate processed historical risk management data in a format for training a machine learning model. In some implementations, the decision platform may use one or more processing techniques on the historical risk management data to convert the historical risk management data into electronic or machine-encoded information (e.g., the processed historical risk management data). For example, the decision platform may utilize optical character recognition, speech recognition, a natural language processing technique, a computational linguistics technique, a text analysis technique, a data normalization method, a data cleansing method, and/or the like, to process the historical risk management data and generate the processed historical risk management data.

In some implementations, the decision platform may utilize optical character recognition (OCR) with the historical risk management data to convert the data into electronic information. Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, passport documents, invoices, bank statements, and/or the like). Implementations of OCR may employ pattern recognition, artificial intelligence, computer vision, and/or the like.

In some implementations, the decision platform may utilize speech recognition with the historical risk management data to convert audio-based information into text-based information. Speech recognition, which may also be known as automatic speech recognition (ASR), computer speech recognition, or speech to text (STT), involves recognizing (e.g., by a computer system) spoken language and translating the spoken language into text. For example, speech recognition may include converting audio data representing recorded language, words, or sentences, to text data representing the recorded language, words, or sentences.

In some implementations, the decision platform may utilize a natural language processing technique, a computational linguistics technique, a text analysis technique, and/or the like, with the historical risk management data in order to make the historical risk management data (e.g., the processed historical risk management data) analyzable. For example, the decision platform may apply natural language processing to interpret the historical risk management data and generate additional information associated with the potential meaning of information within the historical risk management data. Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted).

In some implementations, the decision platform may utilize a data normalization method to process the historical risk management data and to eliminate and/or reduce redundant data from the historical risk management data. The data normalization method may include identifying values or portions of data that are repeated unnecessarily in a file, data structure, and/or the like (e.g., in records or fields, within a table, and/or the like), eliminating such values or portions of data from the file, data structure, and/or the like, converting such values or portions of data from a differing and/or nonstandard format to a same and/or standard format, and/or the like. For example, the data normalization method may include database normalization, such as may be applied to a relational database to organize columns (attributes) and tables (relations) of a relational database to reduce data redundancy and improve data integrity. Database normalization may involve arranging attributes in relations based on dependencies between attributes, ensuring that the dependencies are properly enforced by database integrity constraints. Normalization may be accomplished by applying formal rules either by a process of synthesis (e.g., creating a normalized database design based on a known set of dependencies) or decomposition (e.g., improving an existing (insufficiently normalized) database design based on the known set of dependencies).

In some implementations, the decision platform may utilize a data cleansing method to process the historical risk management data and to detect and/or correct corrupt or inaccurate data from the historical risk management data. The data cleansing method may include detecting and correcting (or removing) corrupt or inaccurate data (e.g., records from a record set, table, or database), and then replacing, modifying, or deleting the corrupt or inaccurate data. The data cleansing method may detect and correct inconsistencies originally caused by user entry errors, by corruption in transmission or storage, or by utilization of different definitions for similar data in different data stores. The data cleansing method may include removing typographical errors or validating and correcting values against a known list of entities. In this case, validation may be strict (e.g., rejecting any address that does not have a valid postal code) or fuzzy (e.g., correcting records that partially match existing, known records). The data cleansing method may also include cleaning data by cross checking the data with a validated data set, standardizing the data by changing a reference data set to a new standard (e.g., use of standard codes), and/or the like. Additionally, the data cleansing method may include data enhancement, where data is made more complete by adding related information (e.g., appending an address with any phone number related to that address). The data cleansing method may also involve activities such as harmonization of data (e.g., harmonization of short codes (e.g., St., Rd., and/or the like) to actual words (e.g., street, road, and/or the like).

In this way, the decision platform may process the historical risk management data to generate the processed historical risk management data.

Figure 1C:
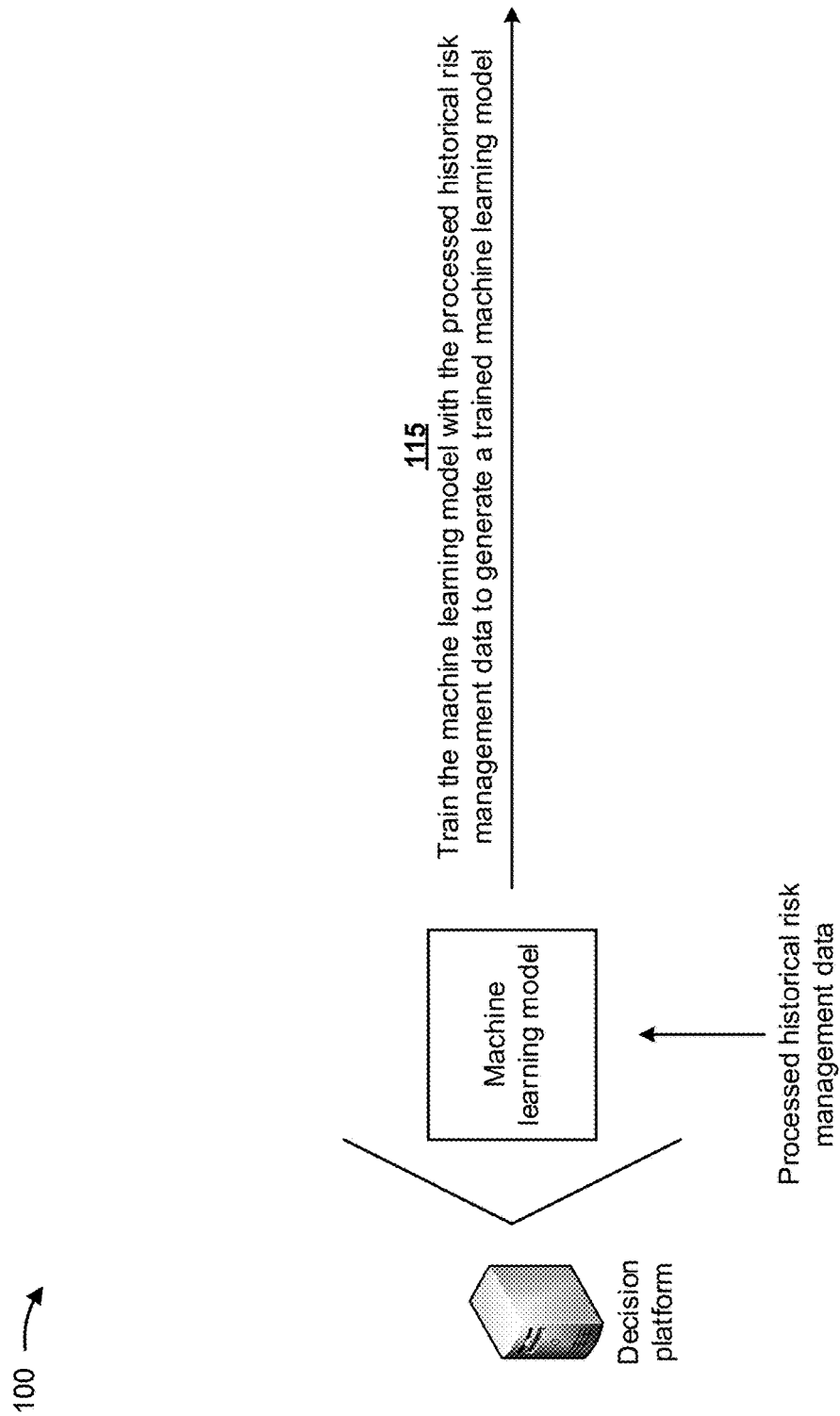

As shown in FIG. 1C, and by reference number 115, the decision platform may train the machine learning model with the processed historical risk management data to generate a trained machine learning model. In some implementations, the machine learning model may include a pattern recognition model that generates complexity level data, risk data, and/or recommendations associated with a potential product.

In some implementations, the decision platform may perform a training operation on the machine learning model, with the processed historical risk management data. The processed historical risk management data may include the data described above for the historical risk management data, historical data indicating complexity levels associated with implementing products referenced in the historical risk management data, historical recommendations for implementing the products referenced in the historical risk management data, and/or the like.

The decision platform may separate the processed historical risk management data into a training set, a validation set, a test set, and/or the like. The training set may be utilized to train the machine learning model. The validation set may be utilized to validate results of the trained machine learning model. The test set may be utilized to test operations of the machine learning model. In some implementations, the decision platform may train the machine learning model using, for example, an unsupervised training procedure and based on the processed historical risk management data. For example, the decision platform may perform dimensionality reduction to reduce the processed historical risk management data to a minimum feature set, thereby reducing resources (e.g., processing resources, memory resources, and/or the like) needed to train the machine learning model, and may apply a classification technique to the minimum feature set.

In some implementations, the decision platform may use a logistic regression classification technique to determine a categorical outcome (e.g., complexity level data, risk data, and/or recommendations associated with a product). Additionally, or alternatively, the decision platform may use a naïve Bayesian classifier technique. In this case, the decision platform may perform binary recursive partitioning to split the processed historical risk management data into partitions and/or branches, and use the partitions and/or branches to perform predictions (e.g., complexity level data, risk data, and/or recommendations associated with a product). Based on using recursive partitioning, the decision platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the decision platform may use a support vector machine (SVM) classifier technique to generate a non-linear boundary between data points in the training set. In this case, the non-linear boundary is used to classify test data into a particular class.

Additionally, or alternatively, the decision platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the decision platform may use one or more other model training techniques, such as a neural network technique, a latent semantic indexing technique, and/or the like. For example, the decision platform may perform an artificial neural network processing technique (e.g., using a two-layer feedforward neural network architecture, a three-layer feedforward neural network architecture, and/or the like) to perform pattern recognition with regard to patterns of the processed historical risk management data. In this case, using the artificial neural network processing technique may improve an accuracy of the trained machine learning model generated by the decision platform by being more robust to noisy, imprecise, or incomplete data, and by enabling the decision platform to detect patterns and/or trends undetectable to human analysts or systems using less complex techniques.

Figure 1D:
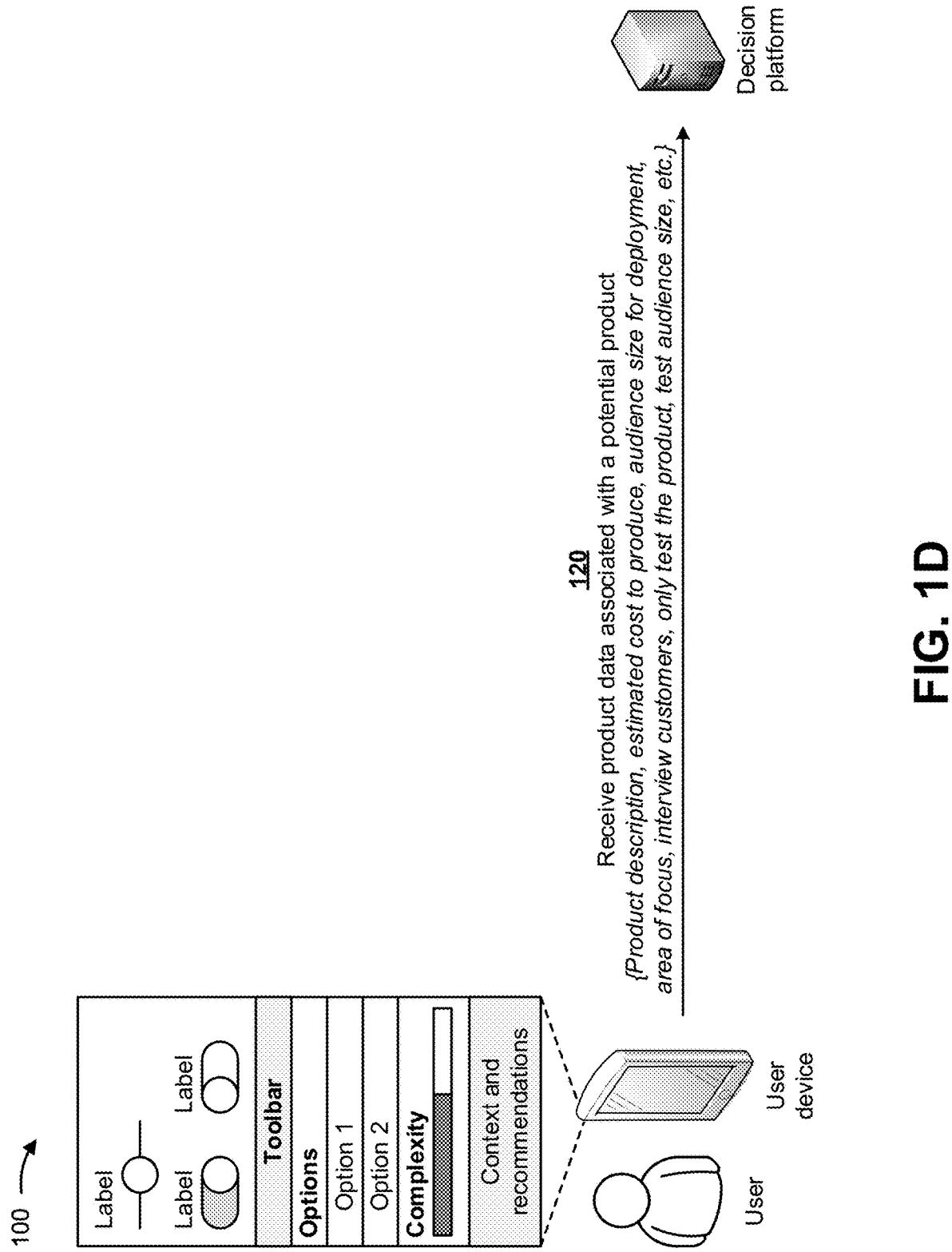

As shown in FIG. 1D, a user device may be associated with the decision platform and may execute an application that enables a user (e.g., via the user device) to generate product data associated with a potential product. In some implementations, the application may display, to the user, a user interface that enables the user to input the product data associated with the potential product. The user interface may permit the user to test product ideas, at a hypothesis level, against established risk thresholds and/or guidelines. The user may cause the user device to provide, to the decision platform, the product data associated with the potential product.

As further shown in FIG. 1D, and by reference number 120, the decision platform may receive, from the user device, the product data associated with the potential product. In some implementations, the product data may include data identifying a description of the potential product, an estimated cost to produce the potential product, an audience size for deployment of the potential product, an area of focus of the potential product, whether potential customers are to be interviewed about the potential product, whether the potential product is to be tested, a test audience size for the potential product when the potential product is to be tested, and/or the like.

Figure 1E:
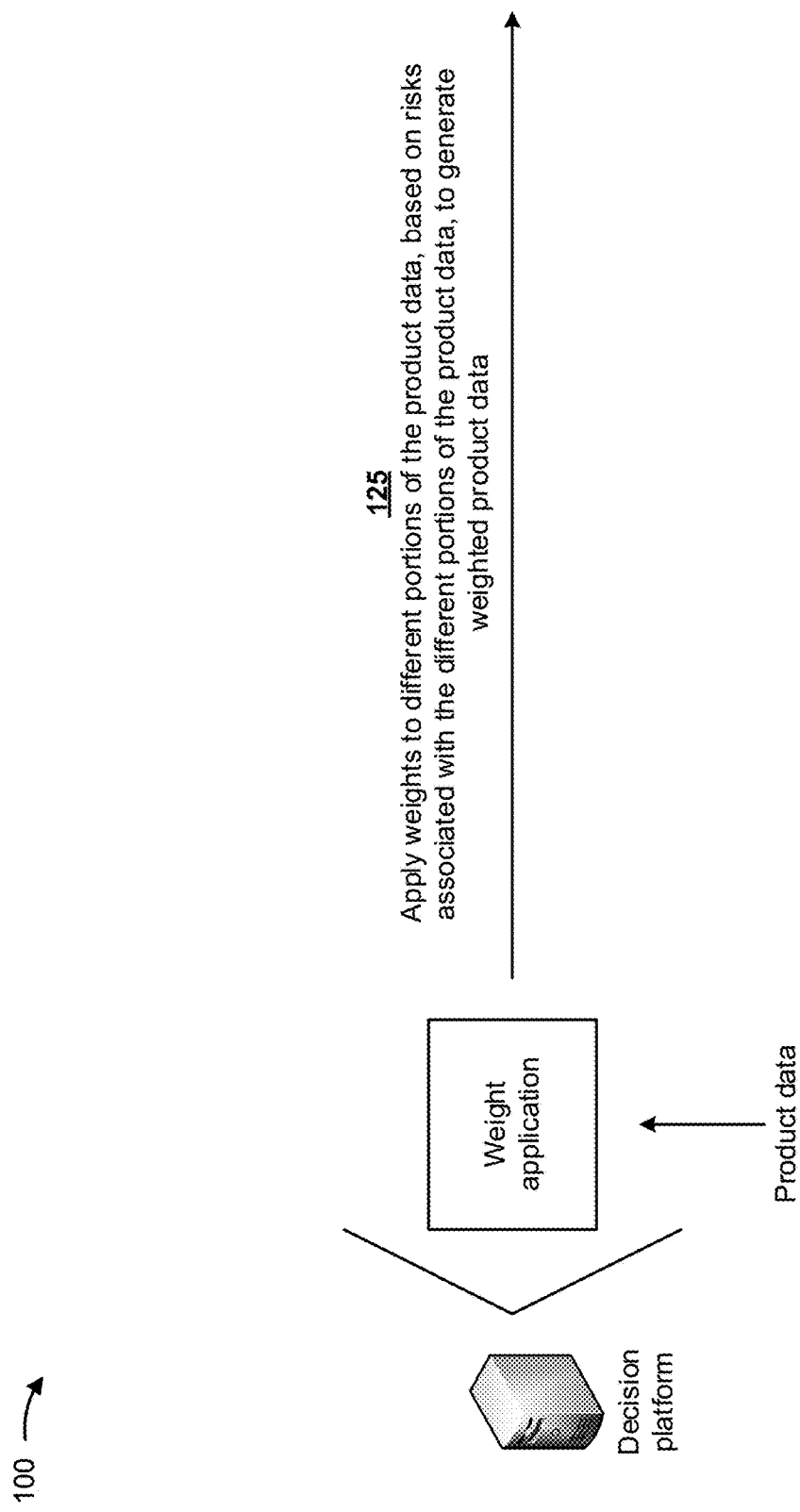

As shown in FIG. 1E, and by reference number 125, the decision platform may apply weights to different portions of the product data, based on risks associated with the different portions of the product data, to generate weighted product data. In some implementations, the decision platform may determine one or more risks associated with a different portion of the product data and may assign weights to each of the one or more risks. The decision platform may add the assigned weights together to determine an overall weight for the different portion of the product data and to generate weighted product data for the different portion. For example, if a portion of the product data indicates legal risks, operational risks, and compliance risks, the decision platform may assign a first weight (e.g., 0.2) to the legal risks, a second weight (e.g., 0.1) to the operational risks, and a third weight (0.3) to the compliance risks based on likelihoods of such risks, importance of such risks, and/or the like. The decision platform may add the assigned weights (e.g., 0.2+0.1+0.3=0.6) to determine an overall weight for the portion of the product data.

In some implementations, different portions of the product data may include weights. For example, if a portion of the product data involves large legal risks, the portion of the product data may be allotted a greater weight than another portion of the product data that involves smaller legal risks. In another example, if a portion of the product data involves larger operational risks than another portion of the product data, the portion of the product data may be allotted a greater weight than the other portion of the product data. In still another example, if a portion of the product data involves smaller compliance risks than another portion of the product data, the portion of the product data may be allotted a smaller weight than the other portion of the product data.

Figure 1F:
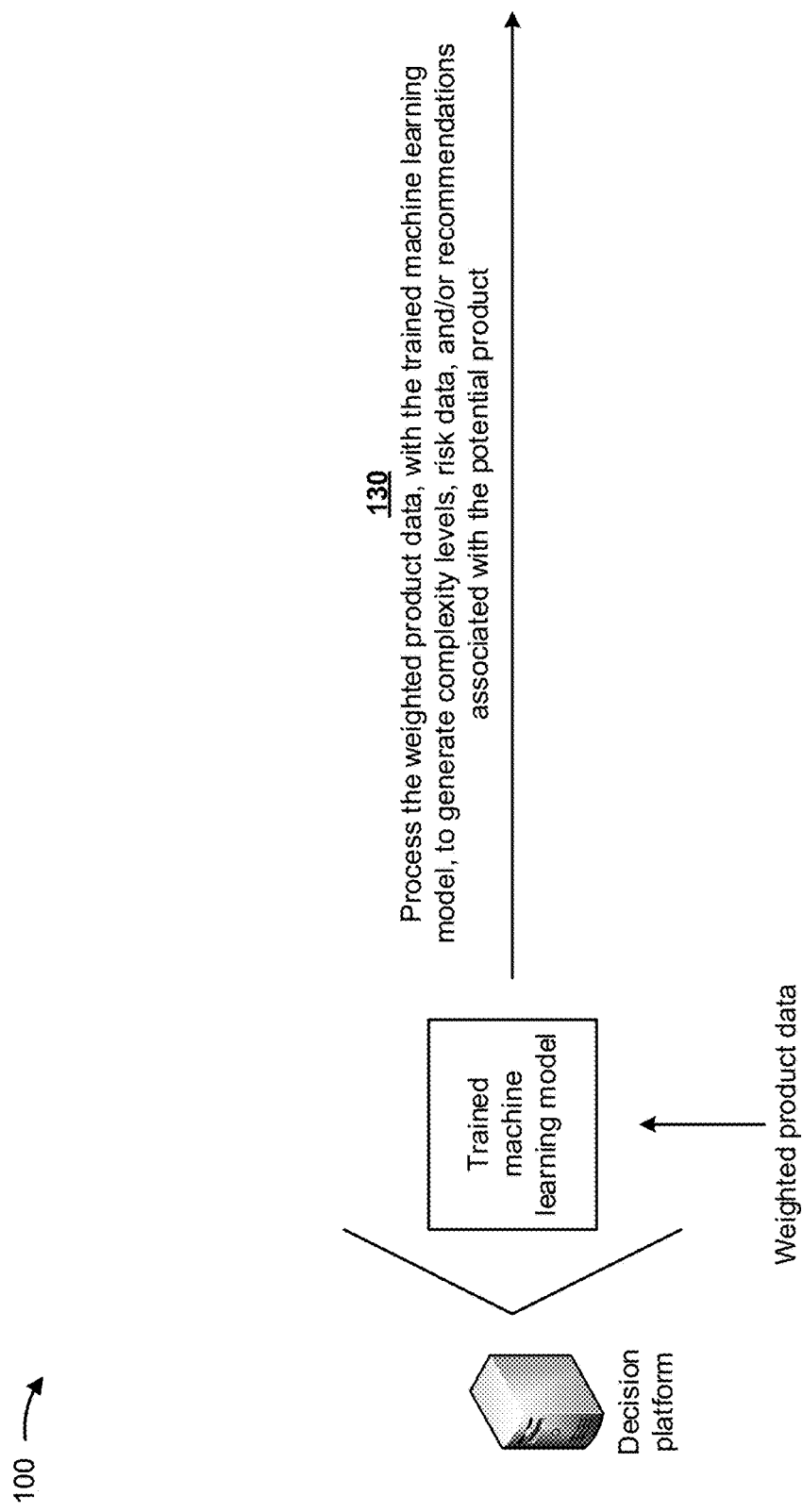

As shown in FIG. 1F, and by reference number 130, the decision platform may process the weighted product data, with the trained machine learning model, to generate complexity levels, risk data, and/or recommendations associated with the potential product. In some implementations, the complexity levels associated with the potential product may include information indicating complexity levels associated with different stages (e.g., a development stage, a testing stage, a manufacturing stage, a selling stage, and/or the like) of implementing the potential product; costs associated with the different stages; risks associated with the different stages; and/or the like. In some implementations, the decision platform may generate an overall complexity level for the potential product based on the complexity levels associated with the different stages of implementing the potential product. For example, if the development stage, the testing stage, the manufacturing stage, and the selling stage include complexity levels of 3, 1, 2, and 1, respectively, the overall complexity level for the potential product may be 7 (e.g., 3+1+2+1=7).

In some implementations, the risk data associated with the potential product may include legal risk data associated with the potential product, operational risk data associated with the potential product, compliance risk data associated with the potential product, cybersecurity risk data associated with the products, reputational risk data associated with the potential product, subject matter expertise data associated with the potential product, and/or the like.

In some implementations, the recommendations associated with the potential product may include a recommendation of a next step for developing the potential product; a recommendation of a next step for testing the potential product; a recommendation of a next step for manufacturing the potential product, a recommendation of a next step for selling the potential product; a recommendation of people to contact about the complexity levels or the risk data associated with the potential product, about developing the potential product, about testing the potential product, about manufacturing the potential product, about selling the potential product, etc.; a checklist of tasks to perform before moving forward with the different stages of the potential product; and/or the like.

In some implementations, when determining the recommendations, the decision platform may determine whether the potential product satisfies a risk level; and may determine a first recommendation, of the recommendations, when the potential product satisfies the risk level or may determine a second recommendation, of the recommendations, when the potential product fails to satisfy the risk level.

Figure 1G:
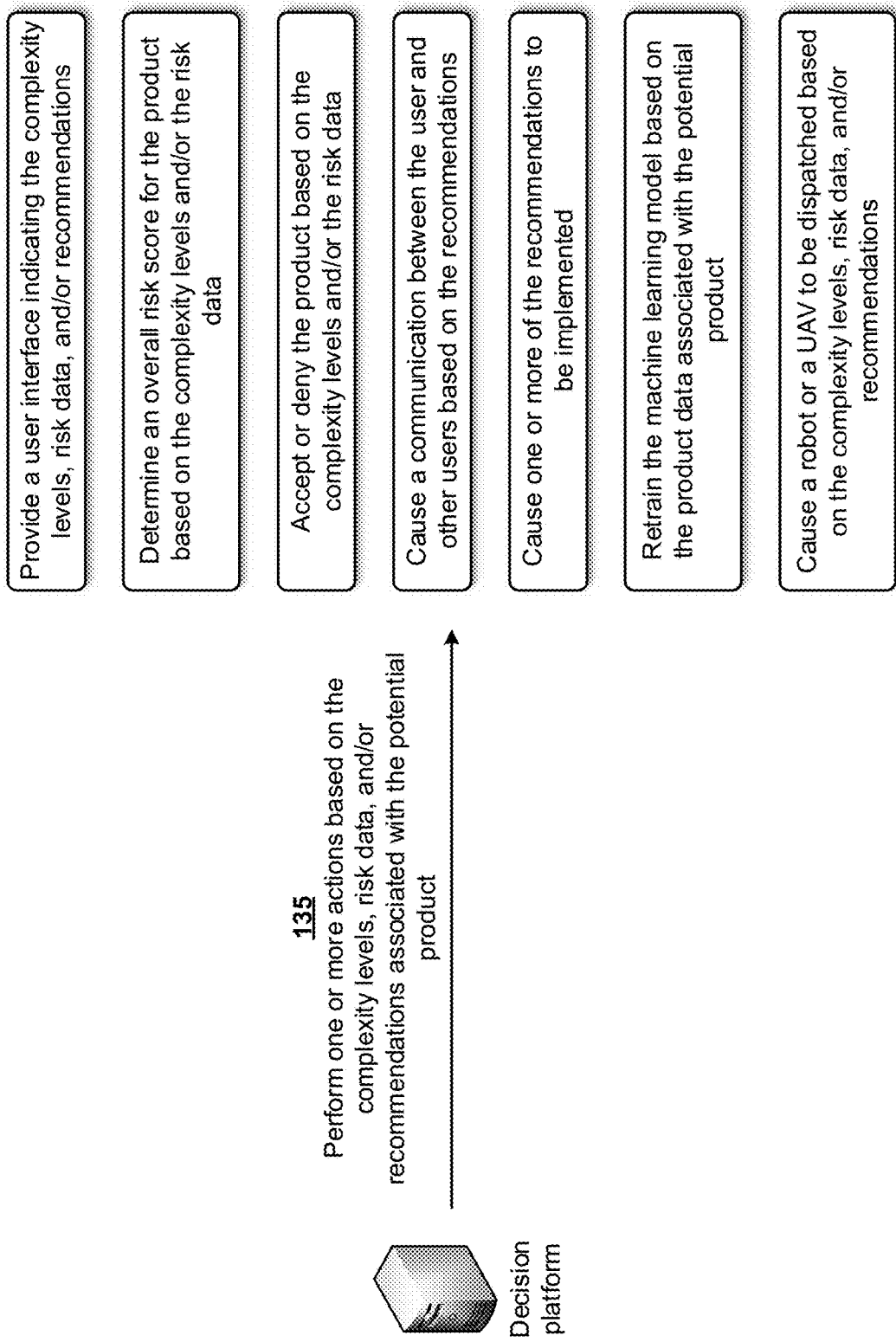

As shown in FIG. 1G, and by reference number 135, the decision platform may perform one or more actions based on the complexity levels, risk data, and/or recommendations associated with the potential product. For example, the one or more actions may include the decision platform providing, to the user device, a user interface indicating the complexity levels, the risk data, the recommendations, and/or the like. In this way, the user may obtain immediate feedback regarding the potential product, may modify one or more product details and obtain immediate feedback based on changing the one or more product details, and/or the like.

In some implementations, the one or more actions may include the decision platform determining an overall risk score for the potential product based on the complexity levels and/or the risk data associated with the potential product. In this way, the decision platform may enable the user to determine whether to move forward with the potential product (e.g., based on the overall risk score), which conserves resources that would otherwise be wasted in moving forward with a potential product that includes too much risk.

In some implementations, the one or more actions may include the decision platform generating an acceptance or a denial of the potential product based on the complexity levels or the risk data associated with the potential product. In this way, the decision platform approves potential products that are not as risky as other potential products (e.g., which are denied), which conserves resources that would otherwise be wasted in moving forward with the other potential products.

In some implementations, the one or more actions may include the decision platform causing a communication to be established between the user device and another user device, associated with, e.g., a risk compliance expert, based on the recommendations associated with the potential product. In this way, the user may be immediately put in contact with an expert that may aid the user in determining whether to continue with development of the potential product (e.g., based on risks associated with the potential product).

In some implementations, the one or more actions may include the decision platform causing one or more of the recommendations associated with the potential product to be implemented. In this way, the decision platform may automatically implement next steps associated with the potential product, which conserves resources that would otherwise be wasted in attempting to determine the next steps associated with the potential product.

In some implementations, the one or more actions may include the decision platform retraining the machine learning model based on the product data associated with the potential product. In this way, the machine learning model is updated to provide more-informed outputs associated with future product data.

In some implementations, the one or more actions may include the decision platform causing a robot or an unmanned aerial vehicle to be dispatched, to begin development of the potential product, based on the one or more of the complexity levels, the risk data, or the recommendations associated with the potential product. In this way, the decision platform automatically begins the development process, which conserves resources that would otherwise be wasted in attempting to determine whether to proceed with development of the potential product.

In some implementations, the one or more actions may include the decision platform providing, to the user device, a checklist of tasks to perform before moving forward with development of the potential product; receiving information indicating that the tasks of the checklist of tasks have been performed; and causing development of the potential product to move forward based on the information indicating that the tasks of the checklist of tasks have been performed. In this way, the decision platform automatically begins the development process after the tasks on the checklist are performed, which conserves resources that would otherwise be wasted in attempting to determine whether to proceed with development of the potential product.

In this way, several different stages of the process for determining complexity levels, risks, and/or recommendations for a proposed product are automated with machine learning, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes a machine learning model to determine complexity levels, risks, and/or recommendations for a proposed product. Finally, automating the process for determining complexity levels, risks, and/or recommendations for a proposed product conserves computing resources (e.g., processing resources, memory resources, and/or the like) that would otherwise be wasted in proceeding with products that fail, reworking deficient products, and/or the like.

As indicated above, FIGS. 1A-1G are provided merely as examples. Other examples may differ from what is described with regard to FIGS. 1A-1G.

Figure 2:
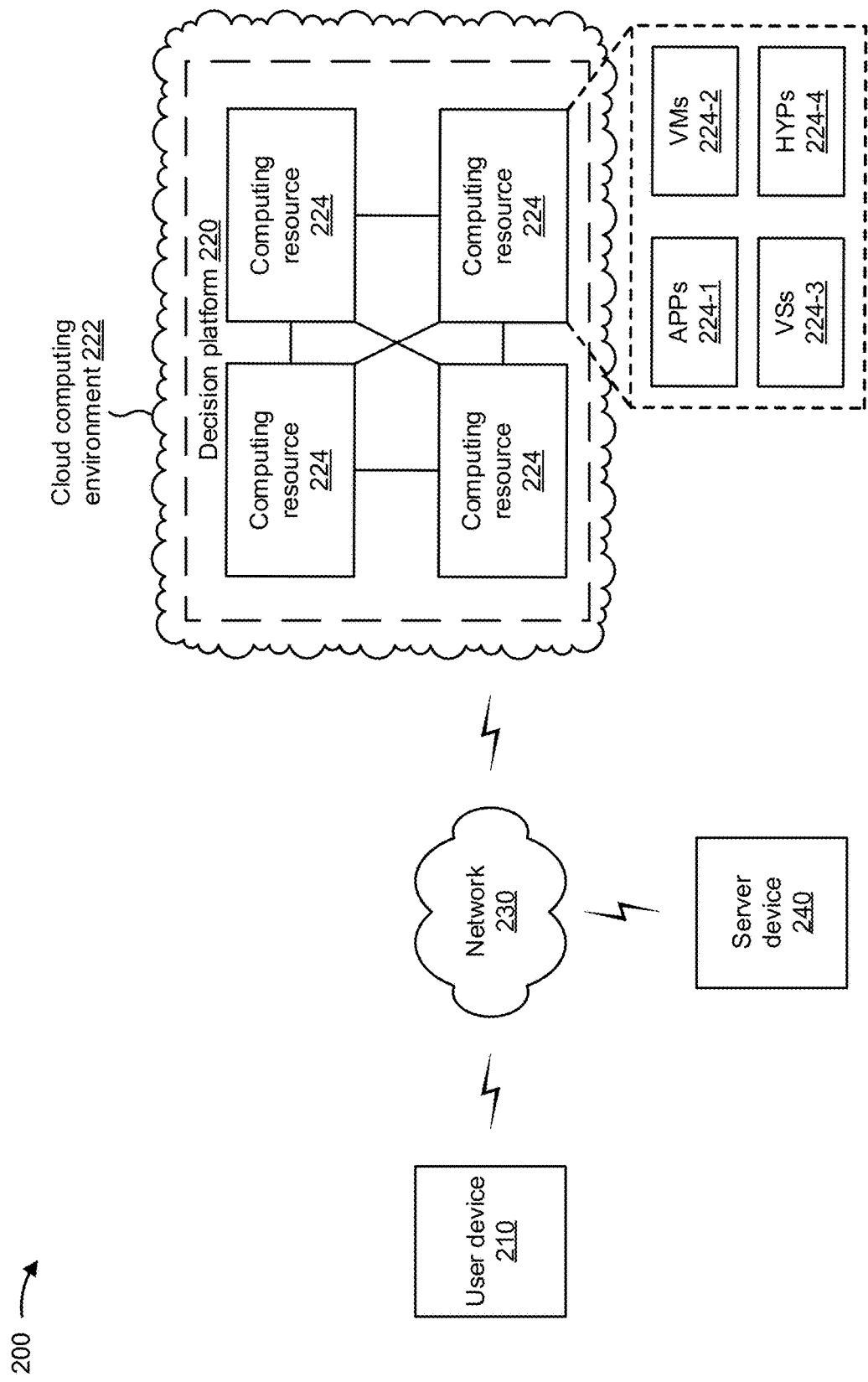
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a decision platform 220, a network 230, and a server device 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to decision platform 220 and/or server device 240. Decision platform 220 includes one or more devices that utilize a machine learning model to determine complexity levels, risks, and/or recommendations for a proposed product. In some implementations, decision platform 220 may be designed to be modular such that certain software components may be swapped in or out depending on a particular need. As such, decision platform 220 may be easily and/or quickly reconfigured for different uses. In some implementations, decision platform 220 may receive information from and/or transmit information to one or more user devices 210 and/or server devices 240.

In some implementations, as shown, decision platform 220 may be hosted in a cloud computing environment 222. Notably, while implementations described herein describe decision platform 220 as being hosted in cloud computing environment 222, in some implementations, decision platform 220 may be non-cloud-based (i.e., may be implemented outside of a cloud computing environment) or may be partially cloud-based.

Cloud computing environment 222 includes an environment that hosts decision platform 220. Cloud computing environment 222 may provide computation, software, data access, storage, etc. services that do not require end-user knowledge of a physical location and configuration of system(s) and/or device(s) that host decision platform 220. As shown, cloud computing environment 222 may include a group of computing resources 224 (referred to collectively as "computing resources 224" and individually as "computing resource 224").

Computing resource 224 includes one or more personal computers, workstation computers, server devices, and/or other types of computation and/or communication devices. In some implementations, computing resource 224 may host decision platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with decision platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 and/or server device 240 or an operator of decision platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with a merchant, a financial institution, and/or the like. In some implementations, server device 240 may receive information from and/or transmit information to user device 210 and/or decision platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
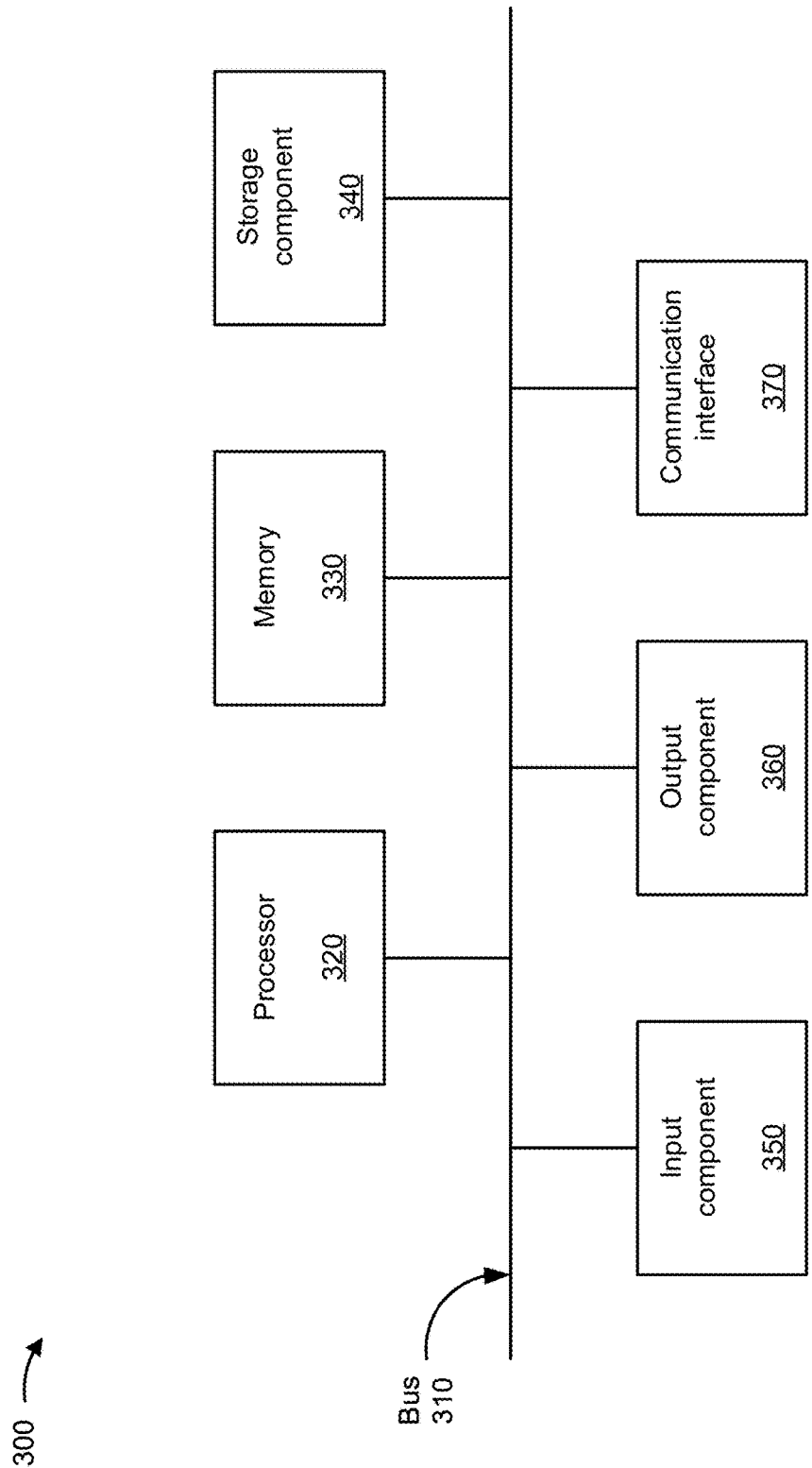
FIG. 3 is a diagram of example components of one or more devices of FIG. 2.

FIG. 3 is a diagram of example components of a device 300. Device 300 may correspond to user device 210, decision platform 220, computing resource 224, and/or server device 240. In some implementations, user device 210, decision platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
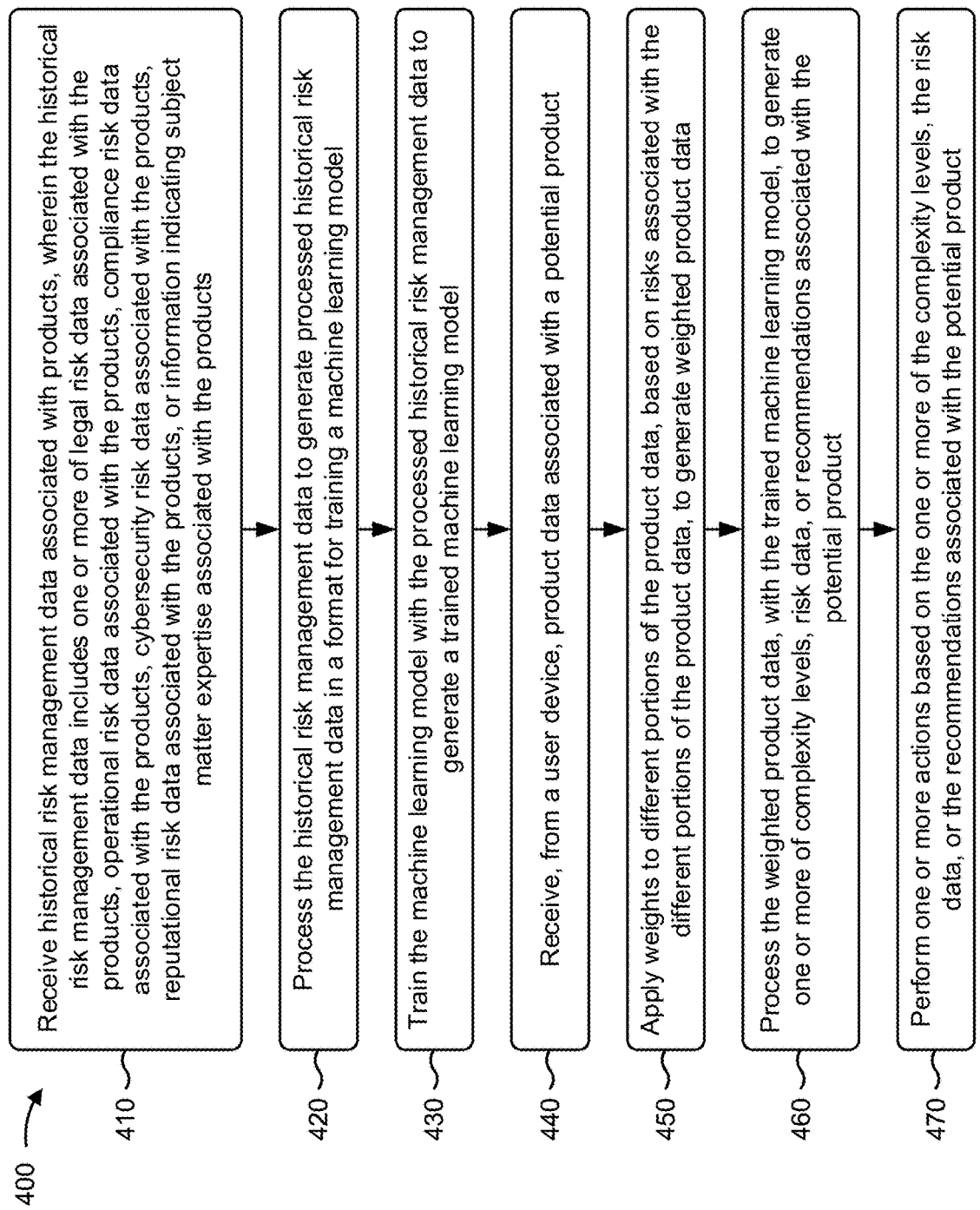
FIGS. 4-6 are flow charts of example processes for utilizing a machine learning model to determine complexity levels, risks, and/or recommendations for a proposed product.

FIG. 4 is a flow chart of an example process 400 for utilizing a machine learning model to determine complexity levels, risks, and/or recommendations for a proposed product. In some implementations, one or more process blocks of FIG. 4 may be performed by a decision platform (e.g., decision platform 220). In some implementations, one or more process blocks of FIG. 4 may be performed by another device or a group of devices separate from or including the decision platform, such as a user device (e.g., user device 210) and/or a server device (e.g., server device 240).

As shown in FIG. 4, process 400 may include receiving historical risk management data associated with products, wherein the historical risk management data includes one or more of legal risk data associated with the products, operational risk data associated with the products, compliance risk data associated with the products, cybersecurity risk data associated with the products, reputational risk data associated with the products, or information indicating subject matter expertise associated with the products (block 410). For example, the decision platform (e.g., using computing resource 224, processor 320, communication interface 370, and/or the like) may receive historical risk management data associated with products, as described above in connection with FIGS. 1A-2. In some implementations, the historical risk management data may include one or more of legal risk data associated with the products, operational risk data associated with the products, compliance risk data associated with the products, cybersecurity risk data associated with the products, reputational risk data associated with the products, or information indicating subject matter expertise associated with the products.

As further shown in FIG. 4, process 400 may include processing the historical risk management data to generate processed historical risk management data in a format for training a machine learning model (block 420). For example, the decision platform (e.g., using computing resource 224, processor 320, memory 330, and/or the like) may process the historical risk management data to generate processed historical risk management data in a format for training a machine learning model, as described above in connection with FIGS. 1A-2.

As further shown in FIG. 4, process 400 may include training the machine learning model with the processed historical risk management data to generate a trained machine learning model (block 430). For example, the decision platform (e.g., using computing resource 224, processor 320, storage component 340, and/or the like) may train the machine learning model with the processed historical risk management data to generate a trained machine learning model, as described above in connection with FIGS. 1A-2.

As further shown in FIG. 4, process 400 may include receiving, from a user device, product data associated with a potential product (block 440). For example, the decision platform (e.g., using computing resource 224, processor 320, communication interface 370, and/or the like) may receive, from a user device, product data associated with a potential product, as described above in connection with FIGS. 1A-2.

As further shown in FIG. 4, process 400 may include applying weights to different portions of the product data, based on risks associated with the different portions of the product data, to generate weighted product data (block 450). For example, the decision platform (e.g., using computing resource 224, processor 320, memory 330, and/or the like) may apply weights to different portions of the product data, based on risks associated with the different portions of the product data, to generate weighted product data, as described above in connection with FIGS. 1A-2.

As further shown in FIG. 4, process 400 may include processing the weighted product data, with the trained machine learning model, to generate one or more of complexity levels, risk data, or recommendations associated with the potential product (block 460). For example, the decision platform (e.g., using computing resource 224, processor 320, storage component 340, and/or the like) may process the weighted product data, with the trained machine learning model, to generate one or more of complexity levels, risk data, or recommendations associated with the potential product, as described above in connection with FIGS. 1A-2.

As further shown in FIG. 4, process 400 may include performing one or more actions based on the one or more of the complexity levels, the risk data, or the recommendations associated with the potential product (block 470). For example, the decision platform (e.g., using computing resource 224, processor 320, memory 330, communication interface 370, and/or the like) may perform one or more actions based on the one or more of the complexity levels, the risk data, or the recommendations associated with the potential product, as described above in connection with FIGS. 1A-2.

Process 400 may include additional implementations, such as any single implementation or any combination of implementations described below and/or described with regard to any other process described herein.

In some implementations, the product data may include information indicating a description of the potential product, an estimated cost to produce the potential product, an audience size for deployment of the potential product, an area of focus of the potential product, whether potential customers are to be interviewed about the potential product, whether the potential product is to be tested, and/or a test audience size for the potential product when the potential product is to be tested.

In some implementations, when performing the one or more actions, the decision platform may provide, to the user device, a user interface indicating the one or more of the complexity levels, the risk data, or the recommendations associated with the potential product; may determine an overall risk score for the potential product based on the complexity levels or the risk data associated with the potential product; may generate an acceptance or a denial of the potential product based on the complexity levels or the risk data associated with the potential product; and/or may cause a communication to be established between the user device and another user device, associated with a risk compliance expert, based on the recommendations associated with the potential product.

In some implementations, when performing the one or more actions, the decision platform may cause one or more of the recommendations associated with the potential product to be implemented; may retrain the machine learning model based on the product data associated with the potential product; and/or may cause a robot or an unmanned aerial vehicle to be dispatched, to begin development of the potential product, based on the one or more of the complexity levels, the risk data, or the recommendations associated with the potential product.

In some implementations, the recommendations associated with the potential product may include a recommendation of a next step for developing the potential product, a recommendation of a next step for manufacturing the potential product, and/or a recommendation of a person to contact about the complexity levels or the risk data associated with the potential product.

In some implementations, the decision platform may determine whether the potential product satisfies a risk level; may determine a first recommendation, of the recommendations, when the potential product satisfies the risk level; and/or may determine a second recommendation, of the recommendations, when the potential product fails to satisfy the risk level. In some implementations, when receiving, from the user device, the product data associated with the potential product, the decision platform may receive, from the user device, the product data based on inputs received by an application executing on the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
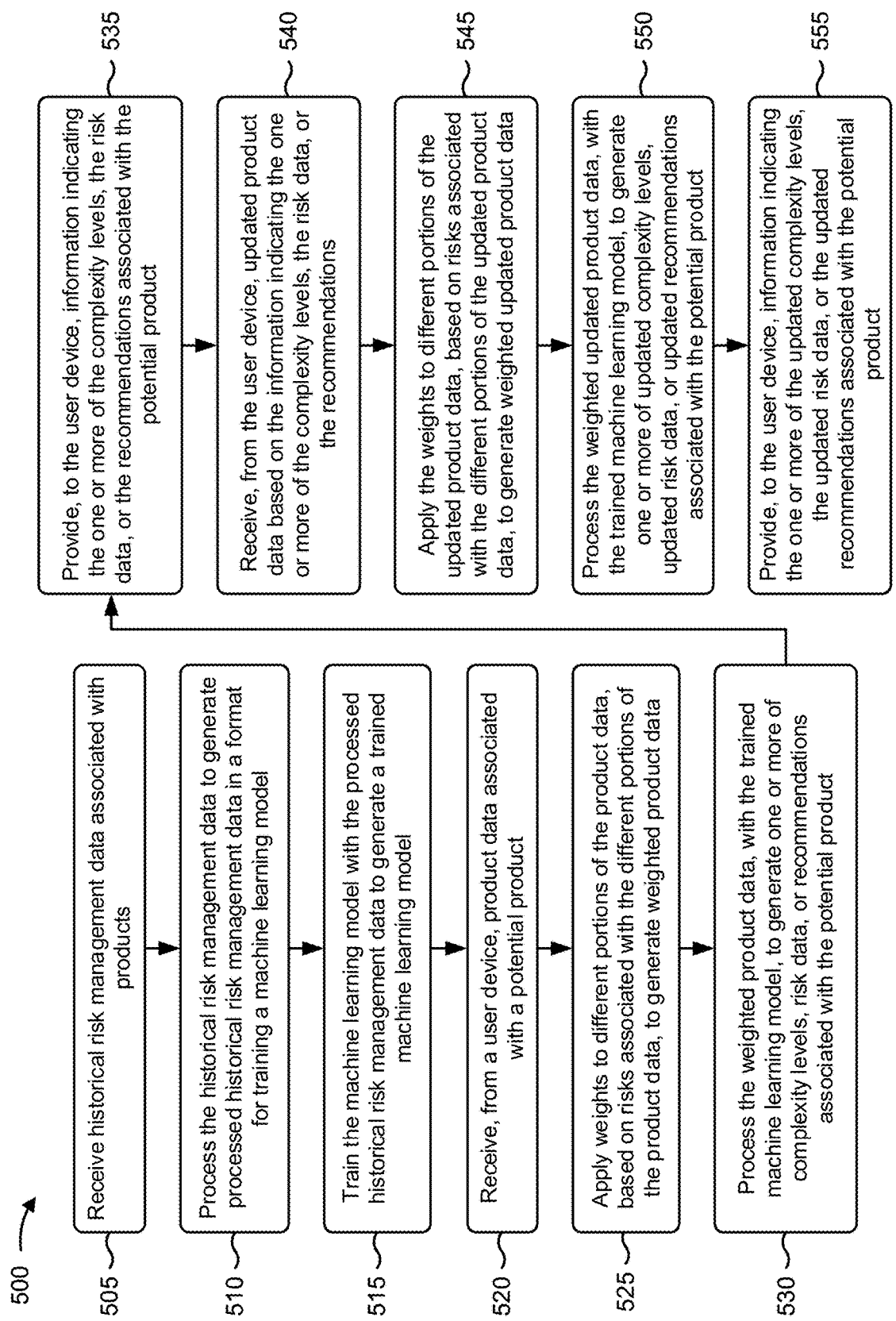

FIG. 5 is a flow chart of an example process 500 for utilizing a machine learning model to determine complexity levels, risks, and/or recommendations for a proposed product. In some implementations, one or more process blocks of FIG. 5 may be performed by a decision platform (e.g., decision platform 220). In some implementations, one or more process blocks of FIG. 5 may be performed by another device or a group of devices separate from or including the decision platform, such as a user device (e.g., user device 210) and/or a server device (e.g., server device 240).

As shown in FIG. 5, process 500 may include receiving historical risk management data associated with products (block 505). For example, the decision platform (e.g., using computing resource 224, processor 320, communication interface 370, and/or the like) may receive historical risk management data associated with products, as described above in connection with FIGS. 1A-2.

As further shown in FIG. 5, process 500 may include processing the historical risk management data to generate processed historical risk management data in a format for training a machine learning model (block 510). For example, the decision platform (e.g., using computing resource 224, processor 320, storage component 340, and/or the like) may process the historical risk management data to generate processed historical risk management data in a format for training a machine learning model, as described above in connection with FIGS. 1A-2.

As further shown in FIG. 5, process 500 may include training the machine learning model with the processed historical risk management data to generate a trained machine learning model (block 515). For example, the decision platform (e.g., using computing resource 224, processor 320, memory 330, and/or the like) may train the machine learning model with the processed historical risk management data to generate a trained machine learning model, as described above in connection with FIGS. 1A-2.

As further shown in FIG. 5, process 500 may include receiving, from a user device, product data associated with a potential product (block 520). For example, the decision platform (e.g., using computing resource 224, processor 320, communication interface 370, and/or the like) may receive, from a user device, product data associated with a potential product, as described above in connection with FIGS. 1A-2.

As further shown in FIG. 5, process 500 may include applying weights to different portions of the product data, based on risks associated with the different portions of the product data, to generate weighted product data (block 525). For example, the decision platform (e.g., using computing resource 224, processor 320, memory 330, and/or the like) may apply weights to different portions of the product data, based on risks associated with the different portions of the product data, to generate weighted product data, as described above in connection with FIGS. 1A-2.

As further shown in FIG. 5, process 500 may include processing the weighted product data, with the trained machine learning model, to generate one or more of complexity levels, risk data, or recommendations associated with the potential product (block 530). For example, the decision platform (e.g., using computing resource 224, processor 320, storage component 340, and/or the like) may process the weighted product data, with the trained machine learning model, to generate one or more of complexity levels, risk data, or recommendations associated with the potential product, as described above in connection with FIGS. 1A-2.

As further shown in FIG. 5, process 500 may include providing, to the user device, information indicating the one or more of the complexity levels, the risk data, or the recommendations associated with the potential product (block 535). For example, the decision platform (e.g., using computing resource 224, processor 320, communication interface 370, and/or the like) may provide, to the user device, information indicating the one or more of the complexity levels, the risk data, or the recommendations associated with the potential product, as described above in connection with FIGS. 1A-2.

As further shown in FIG. 5, process 500 may include receiving, from the user device, updated product data based on the information indicating the one or more of the complexity levels, the risk data, or the recommendations (block 540). For example, the decision platform (e.g., using computing resource 224, processor 320, communication interface 370, and/or the like) may receive, from the user device, updated product data based on the information indicating the one or more of the complexity levels, the risk data, or the recommendations, as described above in connection with FIGS. 1A-2.

As further shown in FIG. 5, process 500 may include applying the weights to different portions of the updated product data, based on risks associated with the different portions of the updated product data, to generate weighted updated product data (block 545). For example, the decision platform (e.g., using computing resource 224, processor 320, memory 330, and/or the like) may apply the weights to different portions of the updated product data, based on risks associated with the different portions of the updated product data, to generate weighted updated product data, as described above in connection with FIGS. 1A-2.

As further shown in FIG. 5, process 500 may include processing the weighted updated product data, with the trained machine learning model, to generate one or more of updated complexity levels, updated risk data, or updated recommendations associated with the potential product (block 550). For example, the decision platform (e.g., using computing resource 224, processor 320, storage component 340, and/or the like) may process the weighted updated product data, with the trained machine learning model, to generate one or more of updated complexity levels, updated risk data, or updated recommendations associated with the potential product, as described above in connection with FIGS. 1A-2.

As further shown in FIG. 5, process 500 may include providing, to the user device, information indicating the one or more of the updated complexity levels, the updated risk data, or the updated recommendations associated with the potential product (block 555). For example, the decision platform (e.g., using computing resource 224, processor 320, memory 330, communication interface 370, and/or the like) may provide, to the user device, information indicating the one or more of the updated complexity levels, the updated risk data, or the updated recommendations associated with the potential product, as described above in connection with FIGS. 1A-2.

Process 500 may include additional implementations, such as any single implementation or any combination of implementations described below and/or described with regard to any other process described herein.

In some implementations, the historical risk management data may include legal risk data associated with the products, operational risk data associated with the products, compliance risk data associated with the products, cybersecurity risk data associated with the products, reputational risk data associated with the products, and/or information indicating subject matter expertise associated with the products. In some implementations, the decision platform may perform one or more actions based on the one or more of the updated complexity levels, the updated risk data, or the updated recommendations associated with the potential product.

In some implementations, when performing the one or more actions, the decision platform may provide, to the user device, a checklist of tasks to perform before moving forward with development of the potential product; may receive information indicating that the tasks of the checklist of tasks have been performed; and/or may cause development of the potential product to move forward based on the information indicating that the tasks of the checklist of tasks have been performed.

In some implementations, when performing the one or more actions, the decision platform may provide, to the user device, a user interface indicating the one or more of the updated complexity levels, the updated risk data, or the updated recommendations associated with the potential product; may determine an overall risk score for the potential product based on the updated complexity levels or the updated risk data associated with the potential product; may generate an acceptance or a denial of the potential product based on the updated complexity levels or the updated risk data associated with the potential product; and/or may cause a communication to be established between the user device and another user device, associated with a risk compliance expert, based on the updated recommendations associated with the potential product.

In some implementations, when performing the one or more actions, the decision platform may cause one or more of the updated recommendations associated with the potential product to be performed; may retrain the machine learning model based on the product data associated with the potential product; and/or may cause a robot or an unmanned aerial vehicle to be dispatched, to begin development of the potential product, based on the one or more of the updated complexity levels, the updated risk data, or the updated recommendations associated with the potential product.

In some implementations, the decision platform may determine whether the potential product satisfies a risk level; may determine a first recommendation, of the recommendations, when the potential product satisfies the risk level; and/or may determine a second recommendation, of the recommendations, when the potential product fails to satisfy the risk level.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
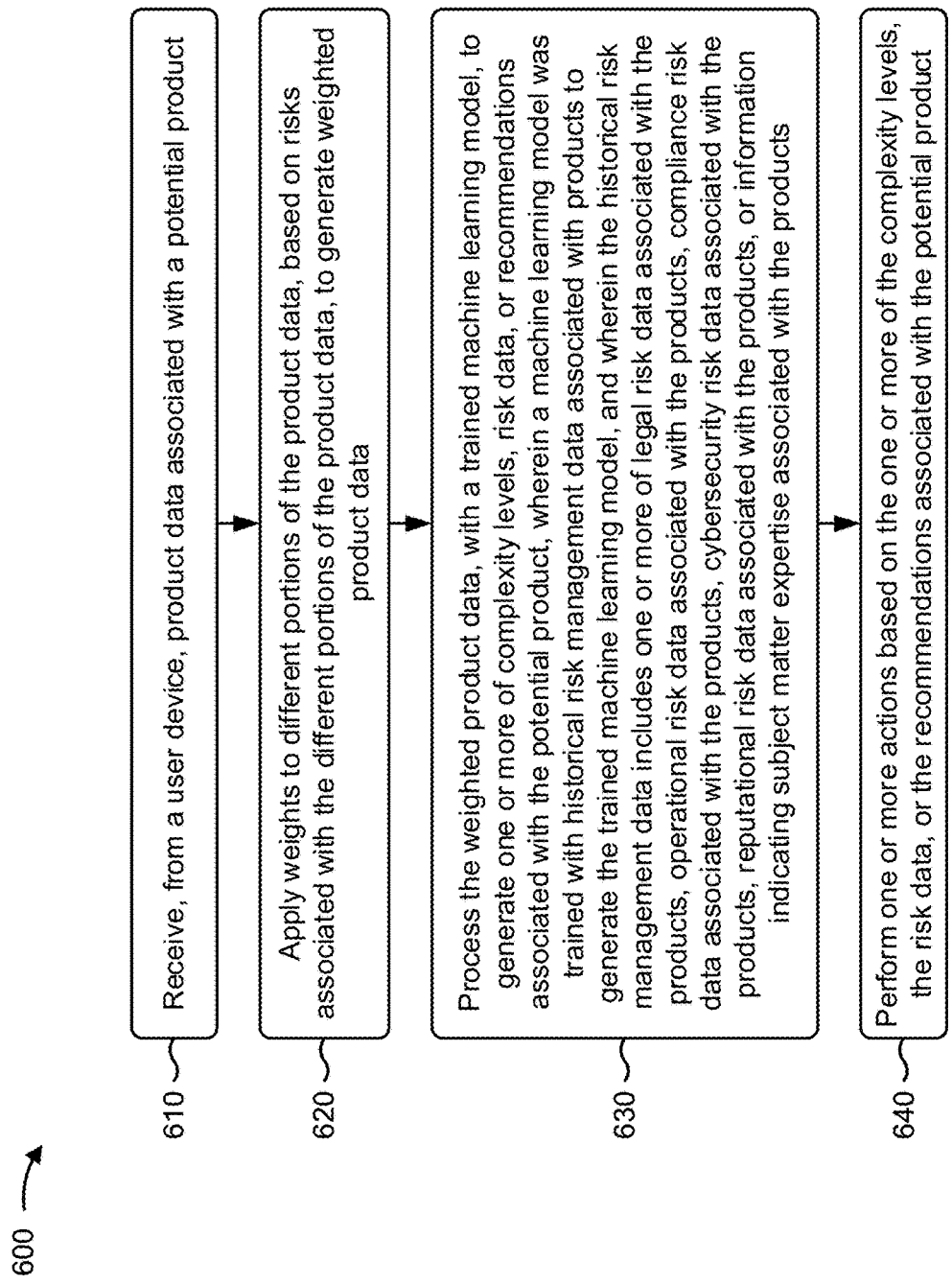

FIG. 6 is a flow chart of an example process 600 for utilizing a machine learning model to determine complexity levels, risks, and/or recommendations for a proposed product. In some implementations, one or more process blocks of FIG. 6 may be performed by a decision platform (e.g., decision platform 220). In some implementations, one or more process blocks of FIG. 6 may be performed by another device or a group of devices separate from or including the decision platform, such as a user device (e.g., user device 210) and/or a server device (e.g., server device 240).

As shown in FIG. 6, process 600 may include receiving, from a user device, product data associated with a potential product (block 610). For example, the decision platform (e.g., using computing resource 224, processor 320, communication interface 370, and/or the like) may receive, from a user device, product data associated with a potential product, as described above in connection with FIGS. 1A-2.

As further shown in FIG. 6, process 600 may include applying weights to different portions of the product data, based on risks associated with the different portions of the product data, to generate weighted product data (block 620). For example, the decision platform (e.g., using computing resource 224, processor 320, storage component 340, and/or the like) may apply weights to different portions of the product data, based on risks associated with the different portions of the product data, to generate weighted product data, as described above in connection with FIGS. 1A-2.

As further shown in FIG. 6, process 600 may include processing the weighted product data, with a trained machine learning model, to generate one or more of complexity levels, risk data, or recommendations associated with the potential product, wherein a machine learning model was trained with historical risk management data associated with products to generate the trained machine learning model, and wherein the historical risk management data includes one or more of legal risk data associated with the products, operational risk data associated with the products, compliance risk data associated with the products, cybersecurity risk data associated with the products, reputational risk data associated with the products, or information indicating subject matter expertise associated with the products (block 630). For example, the decision platform (e.g., using computing resource 224, processor 320, memory 330, and/or the like) may process the weighted product data, with a trained machine learning model, to generate one or more of complexity levels, risk data, or recommendations associated with the potential product, as described above in connection with FIGS. 1A-2. In some implementations, a machine learning model may have been trained with historical risk management data associated with products to generate the trained machine learning model, and the historical risk management data may include one or more of legal risk data associated with the products, operational risk data associated with the products, compliance risk data associated with the products, cybersecurity risk data associated with the products, reputational risk data associated with the products, or information indicating subject matter expertise associated with the products.

As further shown in FIG. 6, process 600 may include performing one or more actions based on the one or more of the complexity levels, the risk data, or the recommendations associated with the potential product (block 640). For example, the decision platform (e.g., using computing resource 224, processor 320, storage component 340, communication interface 370, and/or the like) may perform one or more actions based on the one or more of the complexity levels, the risk data, or the recommendations associated with the potential product, as described above in connection with FIGS. 1A-2.

Process 600 may include additional implementations, such as any single implementation or any combination of implementations described below and/or described with regard to any other process described herein.

In some implementations, the decision platform may provide, to the user device, information indicating the one or more of the complexity levels, the risk data, or the recommendations associated with the potential product; may receive, from the user device, updated product data based on the information indicating the one or more of the complexity levels, the risk data, or the recommendations; may apply the weights to different portions of the updated product data, based on risks associated with the different portions of the updated product data, to generate weighted updated product data; may process the weighted updated product data, with the trained machine learning model, to generate one or more of updated complexity levels, updated risk data, or updated recommendations associated with the potential product; and may provide, to the user device, information indicating the one or more of the updated complexity levels, the updated risk data, or the updated recommendations associated with the potential product.

In some implementations, the product data may include information indicating a description of the potential product, an estimated cost to produce the potential product, an audience size for deployment of the potential product, an area of focus of the potential product, whether potential customers are to be interviewed about the potential product, whether the potential product is to be tested, and/or a test audience size for the potential product when the potential product is to be tested.

In some implementations, when performing the one or more actions, the decision platform may provide, to the user device, a user interface indicating the one or more of the complexity levels, the risk data, or the recommendations associated with the potential product; may determine an overall risk score for the potential product based on the complexity levels or the risk data associated with the potential product; may generate an acceptance or a denial of the potential product based on the complexity levels or the risk data associated with the potential product; and/or may cause a communication to be established between the user device and another user device, associated with a risk compliance expert, based on the recommendations associated with the potential product.

In some implementations, when performing the one or more actions, the decision platform may cause one or more of the recommendations associated with the potential product to be performed; may retrain the machine learning model based on the product data associated with the potential product; and/or may cause a robot or an unmanned aerial vehicle to be dispatched, to begin development of the potential product, based on the one or more of the complexity levels, the risk data, or the recommendations associated with the potential product.

In some implementations, the recommendations associated with the potential product may include a recommendation of a next step for developing the potential product, a recommendation of a next step for manufacturing the potential product, and/or a recommendation of a person to contact about the complexity levels or the risk data associated with the potential product.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, historical risk management data associated with products, wherein the historical risk management data includes one or more of:
   legal risk data associated with the products,
   operational risk data associated with the products,
   compliance risk data associated with the products,
   cybersecurity risk data associated with the products, reputational risk data associated with the products, or subject matter expertise data associated with the products;

processing, by the device, the historical risk management data to generate processed historical risk management data in a format for training a machine learning model;

training, by the device, the machine learning model with the processed historical risk management data to generate a trained machine learning model;

receiving, by the device and from a user device, product data associated with a potential product;

applying, by the device, weights to different portions of the product data, based on risks associated with the different portions of the product data, to generate weighted product data;

processing, by the device, the weighted product data, with the trained machine learning model, to generate one or more of complexity levels, risk data, or recommendations associated with the potential product; and performing, by the device, one or more actions based on the one or more of the complexity levels, the risk data, or the recommendations associated with the potential product, wherein performing the one or more actions comprises:
automatically initiating development of the potential product based on information indicating that tasks of a checklist have been performed.

2. The method of claim 1, wherein the product data includes information indicating one or more of:
a description of the potential product,
an estimated cost to produce the potential product,
an audience size for deployment of the potential product,
an area of focus of the potential product,
whether potential customers are to be interviewed about the potential product,
whether the potential product is to be tested, or
a test audience size for the potential product when the potential product is to be tested.

3. The method of claim 1, wherein performing the one or more actions comprises one or more of:
providing, to the user device, a user interface indicating the one or more of the complexity levels, the risk data, or the recommendations associated with the potential product;
determining an overall risk score for the potential product based on the complexity levels or the risk data associated with the potential product;
generating an acceptance or a denial of the potential product based on the complexity levels or the risk data associated with the potential product; or
causing a communication to be established between the user device and another user device, associated with a risk compliance expert, based on the recommendations associated with the potential product.

4. The method of claim 1, wherein performing the one or more actions comprises one or more of:
causing one or more of the recommendations associated with the potential product to be implemented;
retraining the machine learning model based on the product data associated with the potential product; or
causing a robot or an unmanned aerial vehicle to be dispatched, to begin the development of the potential product, based on the one or more of the complexity levels, the risk data, or the recommendations associated with the potential product.

5. The method of claim 1, wherein the recommendations associated with the potential product include one or more of:

a first recommendation of a next step for developing the potential product,
a second recommendation of a next step for manufacturing the potential product, or
a third recommendation of a person to contact about the complexity levels or the risk data associated with the potential product.

6. The method of claim 1, further comprising:
determining whether the potential product satisfies a risk level; and
determining a first recommendation, of the recommendations, when the potential product satisfies the risk level; or
determining a second recommendation, of the recommendations, when the potential product fails to satisfy the risk level.

7. The method of claim 1, wherein receiving, from the user device, the product data associated with the potential product comprises:
receiving, from the user device, the product data based on inputs received by an application executing on the user device.

8. A device, comprising:
one or more memories; and
one or more processors, communicatively coupled to the one or more memories, configured to:
receive historical risk management data associated with products;
process the historical risk management data to generate processed historical risk management data in a format for training a machine learning model;
train the machine learning model with the processed historical risk management data to generate a trained machine learning model;
receive, from a user device, product data associated with a potential product;
apply weights to different portions of the product data, based on first risks associated with the different portions of the product data, to generate weighted product data;
process the weighted product data, with the trained machine learning model, to generate one or more of complexity levels, risk data, or recommendations associated with the potential product;
provide, to the user device, information indicating the one or more of the complexity levels, the risk data, or the recommendations associated with the potential product;
receive, from the user device, updated product data based on the information indicating the one or more of the complexity levels, the risk data, or the recommendations;
apply the weights to different portions of the updated product data, based on second risks associated with the different portions of the updated product data, to generate weighted updated product data;
process the weighted updated product data, with the trained machine learning model, to generate one or more of updated complexity levels, updated risk data, or updated recommendations associated with the potential product; and
provide, to the user device, information indicating the one or more of the updated complexity levels, the updated risk data, or the updated recommendations associated with the potential product.

9. The device of claim 8, wherein the historical risk management data includes one or more of:

legal risk data associated with the products,
operational risk data associated with the products,
compliance risk data associated with the products,
cybersecurity risk data associated with the products,
reputational risk data associated with the products, or
subject matter expertise data associated with the products.

10. The device of claim 8, wherein the one or more processors are further configured to:
   perform one or more actions based on the one or more of the updated complexity levels, the updated risk data, or the updated recommendations associated with the potential product.

11. The device of claim 10, wherein, when performing the one or more actions, the one or more processors are configured to:
   provide, to the user device, a checklist of tasks to perform before moving forward with development of the potential product;
   receive information indicating that the tasks of the checklist of tasks have been performed; and
   cause the development of the potential product to move forward based on the information indicating that the tasks of the checklist of tasks have been performed.

12. The device of claim 10, wherein, when performing the one or more actions, the one or more processors are configured to:
   provide, to the user device, a user interface indicating the one or more of the updated complexity levels, the updated risk data, or the updated recommendations associated with the potential product;
   determine an overall risk score for the potential product based on the updated complexity levels or the updated risk data associated with the potential product;
   generate an acceptance or a denial of the potential product based on the updated complexity levels or the updated risk data associated with the potential product; or
   cause a communication to be established between the user device and another user device, associated with a risk compliance expert, based on the updated recommendations associated with the potential product.

13. The device of claim 10, wherein, when performing the one or more actions, the one or more processors are configured to:
   cause one or more of the updated recommendations associated with the potential product to be performed;
   retrain the machine learning model based on the product data associated with the potential product; or
   cause a robot or an unmanned aerial vehicle to be dispatched, to begin development of the potential product, based on the one or more of the updated complexity levels, the updated risk data, or the updated recommendations associated with the potential product.

14. The device of claim 10, wherein the one or more processors are further configured to:
   determine whether the potential product satisfies a risk level; and
   determine a first recommendation, of the recommendations, when the potential product satisfies the risk level; or
   determine a second recommendation, of the recommendations, when the potential product fails to satisfy the risk level.

15. A non-transitory computer-readable medium storing instructions, the instructions comprising:
   one or more instructions that, when executed by one or more processors of a device, cause the one or more processors to:
      receive, from a user device, product data associated with a potential product;
      apply weights to different portions of the product data, based on risks associated with the different portions of the product data, to generate weighted product data;
      process the weighted product data, with a trained machine learning model, to generate one or more of complexity levels, risk data, or recommendations associated with the potential product,
         wherein a machine learning model was trained with historical risk management data associated with products to generate the trained machine learning model, and
         wherein the historical risk management data includes one or more of:
            legal risk data associated with the products,
            operational risk data associated with the products,
            compliance risk data associated with the products,
            cybersecurity risk data associated with the products,
            reputational risk data associated with the products, or
            subject matter expertise data associated with the products; and
      perform one or more actions based on the one or more of the complexity levels, the risk data, or the recommendations associated with the potential product,
         wherein the one or more actions include:
            providing an indication of approval to begin development.

16. The non-transitory computer-readable medium of claim 15, wherein the instructions further comprise:
   one or more instructions that, when executed by the one or more processors, cause the one or more processors to:
      provide, to the user device, information indicating the one or more of the complexity levels, the risk data, or the recommendations associated with the potential product;
      receive, from the user device, updated product data based on the information indicating the one or more of the complexity levels, the risk data, or the recommendations;
      apply the weights to different portions of the updated product data, based on risks associated with the different portions of the updated product data, to generate weighted updated product data;
      process the weighted updated product data, with the trained machine learning model, to generate one or more of updated complexity levels, updated risk data, or updated recommendations associated with the potential product; and
      provide, to the user device, information indicating the one or more of the updated complexity levels, the updated risk data, or the updated recommendations associated with the potential product.

17. The non-transitory computer-readable medium of claim 15, wherein the product data includes information indicating one or more of:
   a description of the potential product,
   an estimated cost to produce the potential product,
   an audience size for deployment of the potential product,
   an area of focus of the potential product,
   whether potential customers are to be interviewed about the potential product,
   whether the potential product is to be tested, or a test audience size for the potential product when the potential product is to be tested.

18. The non-transitory computer-readable medium of claim 15, wherein the one or more instructions, that cause the one or more processors to perform the one or more actions, cause the one or more processors to one or more of:
provide, to the user device, a user interface indicating the one or more of the complexity levels, the risk data, or the recommendations associated with the potential product;
determine an overall risk score for the potential product based on the complexity levels or the risk data associated with the potential product;
generate an acceptance or a denial of the potential product based on the complexity levels or the risk data associated with the potential product; or
cause a communication to be established between the user device and another user device, associated with a risk compliance expert, based on the recommendations associated with the potential product.

19. The non-transitory computer-readable medium of claim 15, wherein the one or more instructions, that cause the one or more processors to perform the one or more actions, cause the one or more processors to one or more of:
cause one or more of the recommendations associated with the potential product to be performed;
retrain the machine learning model based on the product data associated with the potential product; or
cause a robot or an unmanned aerial vehicle to be dispatched, to begin the development of the potential product, based on the one or more of the complexity levels, the risk data, or the recommendations associated with the potential product.

20. The non-transitory computer-readable medium of claim 15, wherein the recommendations associated with the potential product include one or more of:
a first recommendation of a next step for developing the potential product,
a second recommendation of a next step for manufacturing the potential product, or
a third recommendation of a person to contact about the complexity levels or the risk data associated with the potential product.

* * * * *